United States Patent

Honjo et al.

[11] Patent Number: 5,776,513
[45] Date of Patent: Jul. 7, 1998

[54] DEVICE FOR CONTROLLING TEMPERATURE OF A NOZZLE

[75] Inventors: Yutaka Honjo, Nagoya; Kazumitsu Omori, Handa, both of Japan

[73] Assignee: Kabushiki Kaisha Meiki Seisakusho, Aichi-ken, Japan

[21] Appl. No.: 694,543

[22] Filed: Aug. 9, 1996

[30] Foreign Application Priority Data

Aug. 10, 1995 [JP] Japan ................................. 7-227452
May 27, 1996 [JP] Japan ................................. 8-156169

[51] Int. Cl.$^6$ ............................................. B29C 45/78
[52] U.S. Cl. .......................... 425/143; 264/406; 425/549
[58] Field of Search ............................. 425/143, 549; 264/40.6

[56] References Cited

U.S. PATENT DOCUMENTS 5,272,644  12/1993  Katsumata et al. ............ 425/143
5,435,711   7/1995  Yamada ......................... 425/143
5,529,477   6/1996  Takizawa et al. ............... 425/143

FOREIGN PATENT DOCUMENTS 725117  2/1989  Japan.
512020  3/1993  Japan.

OTHER PUBLICATIONS

Japanese Abstract No. 3-147826, "Temperature Controlling Device for Heating Zone," K. Omori, Meiki Co. Ltd., 1989.
Japanese Abstract No. JP 07-25117, Power Consumption Control Device of Printer, 27 Jan. 1995.

Primary Examiner—Tim Heitbrink
Attorney, Agent, or Firm—Browdy and Neimark

[57] ABSTRACT

A device for controlling temperature of an injection molding machine nozzle to maintain uniform temperature all over the nozzle and to prevent stringiness, drooling and so on of melted resin, which provides a temperature controller for controlling temperature at the front portion and the rear portion of the nozzle by controlling the electric power supplied to the front heater and the rear heater with ON-OFF operation of a relay and a voltage regulator for controlling voltage applied to one of the front heater or the rear heater by an operational amplifier detecting differences of temperature at the front portion and the rear portion of the nozzle.

6 Claims, 4 Drawing Sheets

DEVICE FOR CONTROLLING TEMPERATURE OF A NOZZLE

BACKGROUND OF THE INVENTION

1. Field of the Invention

The present invention relates generally to a device for controlling temperature in an injection molding machine. More particularly, it concerns a device for controlling temperature of an injection molding machine nozzle.

2. Description of the Related arts

In injection molding machines, there have been many systems for temperature control of the nozzle to prevent fluctuation of the viscosity of melted resin.

Generally, a band heater or plural band heaters have been used for controlling the temperature of the nozzle. When the nozzle is heated by plural band heaters, these are put respectively around the outer periphery of the front and rear portions of the nozzle. The plural heaters have been controlled by a single system operation on the constant voltage. When such means are used for controlling the temperature of the nozzle, the temperature at the front portion tends to drop in comparison with the temperature of the rear portion. The reason is that when melted resins injected, the tip of the nozzle touches the mold, which is lower in temperature than the nozzle.

Cooling of the front nozzle portion, due to fluctuation of the mold temperature, causes increased viscosity of the melted resin and increased flow resistance. Injection pressure on melted resin in the mold cavity is increased, which brings about undesirable in stability of the dimensions and/or the weight of molded articles. In extreme cases the nozzle hole becomes clogged and interrupts injection operation.

To prevent these problems, various means have been tried; one to provide the front band heater of the nozzle with more thermal capacity in proportion to the rear band heater; another is to locate a temperature sensor forward of the front nozzle band heaters. However, such means are apt to cause overheating of the rear band heater and burning, stringiness and drooling of melted resin.

Japanese utility patent Jitsu Kou Hei 5-12020 relates to the above matter. This patent discloses that each temperature, at front and rear, is controlled respectively by the temperature control system.

Such a system needs to provide respective temperature control devices for each portion, both the front portion and the rear portion of the nozzle, which raises the manufacturing cost of the injection molding machine and makes control of nozzle temperature complicated because of the individual setting operations needed for each temperature control device.

Japanese patent Toku Kou Hei 7-25117 discloses a temperature control, not for a nozzle, but for a heating barrel of an injection molding machine.

In this invention, plural band heaters are provided on the outer periphery of the heating barrel, several of which are controlled by the temperature detected by a main thermocouple. A pair of sub-thermocouples are provided respectively at front and rear positions adjacent to the main thermocouple. The differences of temperature on both sides of the main thermocouple detected by the pair of sub-thermocouples is used to vary the voltage applies to the several band heaters, and consequently to prevent partial deviation of the temperature of the heating barrel. However, this invention needs two sub-thermocouples plus a main thermocouple for regulating the voltage of several band heaters.

SUMMARY OF THE INVENTION

The present invention had been created in view of above-identified problems.

It is an object of the invention to provide a novel device for controlling the temperature of a nozzle to prevent fluctuation of nozzle temperature when the tip of the nozzle is cooled due to mold contact.

Another object of the present invention is to provide a novel device, for controlling the temperature of a nozzle, that simplifies the operations of setting nozzle temperature and controlling both band heaters at front and rear portions.

A further object of the invention is to provide a novel device for controlling temperature at the front and rear portions of the nozzle by means of regulating the voltage applied to the band heaters with the minimum necessary number of thermocouples.

Still a further object of the invention is to provide a novel device for controlling the temperature of a nozzle, for controlling temperature at the front and rear portions of the nozzle by means of controlling either a front band heater or a rear band heater with the electric power duty cycle and by regulating the voltage of the other band heater.

BRIEF DESCRIPTION OF THE DRAWING

The above and other objects, and the nature and advantages of the present invention, will become more apparent from the following detailed description of embodiments taken in conjunction with the drawings, wherein.

DETAILED DESCRIPTION OF THE PREFERRED EMBODIMENT

Figure 1:
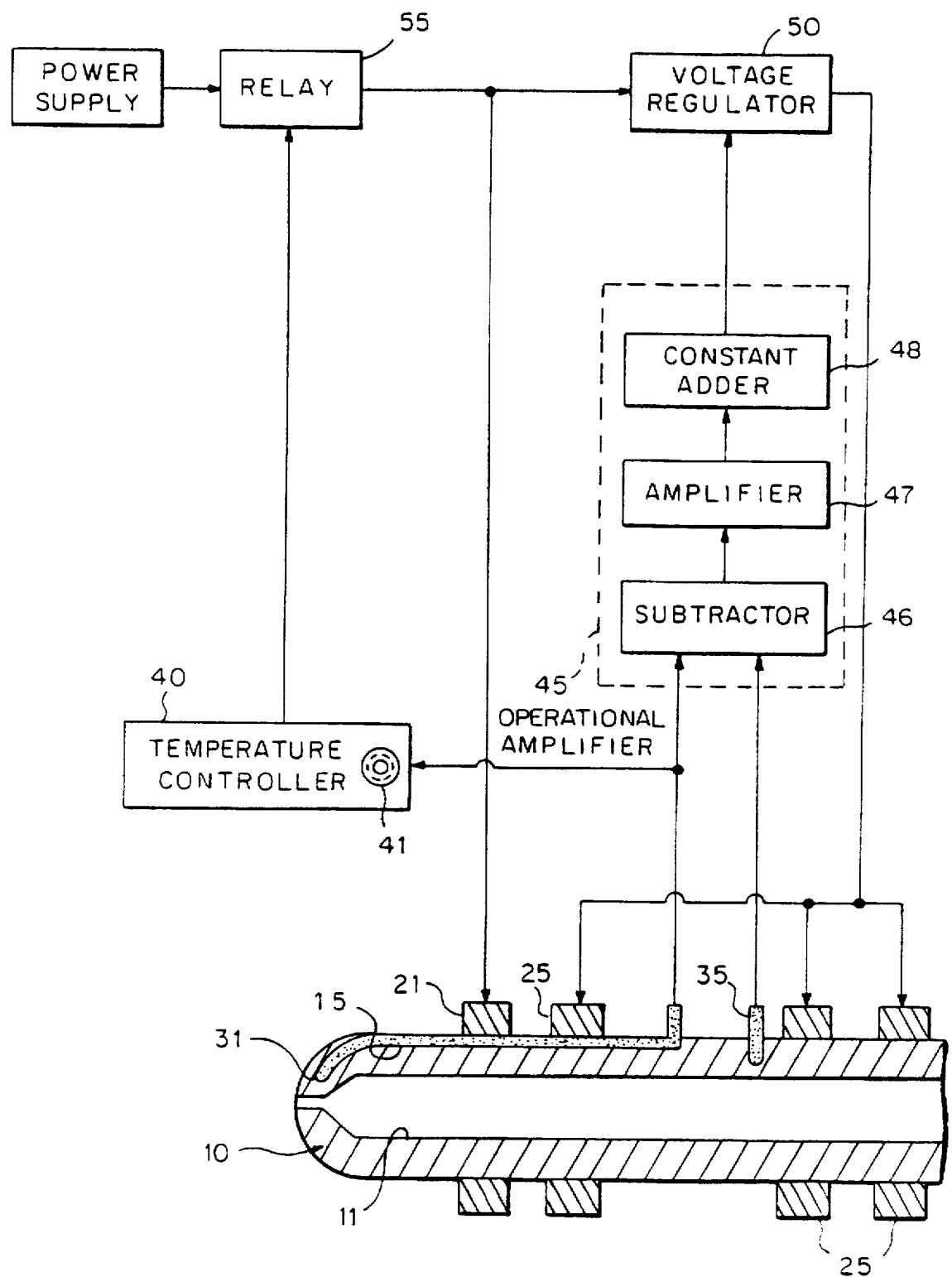
FIG. 1 is a block diagram of a control system for controlling nozzle temperature according to a first embodiment of the invention.

The invention will be described in further detail by way of four exemplary embodiments with reference to the accompany drawing.

In FIG. 1, FIG. 2, FIG. 3, and FIG. 4, a nozzle 10 with a through hole 11 is fixed by threads to the tip of a heating barrel of a injection molding machine (not shown).

After the tip of the nozzle 10 had touched a mold, melted resin is injected into a cavity of the mold through the hole of the nozzle 10.

A front band heater 21 and plural rear band heaters 25 (use of a tubular heater is preferable) are put round and fixed on the outer periphery, respectively of the front portion and the rear portion, of the nozzle 10. Three rear band heaters are used in the preferred embodiment of the invention. Here, and in the following claims "band heater" denotes an embodiment of "a heater". "Heater" may include a band heater or a tubular heater.

A front temperature sensor 31 for detecting temperature at the front portion of the nozzle 10 is located closely as adjacent as possible to the tip of the nozzle 10, or, is located under the front band heater 21, comprising a thermocouple or a thermister provided in a groove 15 along the axial direction of the nozzle 10.

A rear temperature sensor 35 (a thermocouple or a thermister) detects temperature in the rear portion of the nozzle 10 (here, and in the following claims, "rear portion" means all except the front portion). The sensor 35 is located in a nearly central position on the nozzle 10 or it may be located under the rear band heater.

A temperature controller 40 compares the temperature detected by the front temperature sensor 31 (or the rear temperature sensor 35) to a temperature preset by a temperature setting device 41 herein, when the detected temperature is different from the preset temperature, the temperature controller 40 outputs signals with a PID temperature control function (under closed-loop control) to a relay 55. PID stands for p roportional control action, Integral control action and Derivative control action.

The relay 55 carries out ON-OFF operation in a constant cycle under the PID temperature control so as to cancel the temperature difference.

If the detected temperature is lower than the preset temperature, the temperature controller 40 outputs signals to the relay 55 so that ON time in the ON-OFF operation of the relay 55 is longer, to increase electric power supplied to either of the front or the rear band heaters; but if the detected temperature is higher then the temperature controller 40 outputs the signals to the relay 55 is shorter, to decrease the electric power supplied to either of the front or the rear band heaters.

The relay 55 means a mechanical magnetically-operated relay or semiconductor (solid state) relay, particularly as the solid state relay is capable of shortening the ON-OFF cycle to less then than two seconds, and consequently to allow quick response of the relay 55 to the fluctuations of nozzle temperature, to improve the accuracy of the temperature control of the nozzle 10.

An operational amplifier 45, which is either an analog type or a digital type with a micro-processor or microprocessors, includes a subtractor 46, an amplifier 47 and a constant adder 55. The subtractor 46 outputs to the amplifier 47 a signal equivalent to the temperature difference between the front temperature sensor 31 and the rear temperature sensor 35. The amplifier 47 amplifies the signal output from the subtractor 46. The amplified range (amplification range) is determined individually for each injection molding machine according to its configuration, it's dimensions, and the heat capacity of its nozzle and heating barrel. Accordingly, the amplified range need not be adjusted for different injection work so long as the machine does not change.

The constant adder 48 adds a constant value to the signal output from the amplifier 47, making the signals fit for input to the voltage regulator 50. In the preferred embodiments of the invention, the constant value is 5 volts.

The voltage regulator 50 is a device for decreasing or increasing voltage applied to the front band heater 21 or the rear band heaters 25 in response to the signals (hereafter called external control signals) output from the operational amplifier 45.

A specific illustration of the function of the voltage regulator 50: When the external control signals for voltage regulator 50 varies from 1 volt to 5 volts and the power supply voltage is AC 200 volts, the voltage regulator 50 outputs linearly voltages from zero to AC 200 volts to the front band heater 21 or the rear band heaters 25. It is preferable to use as the voltage regulator 50 a thyrister with the switch-on phase controlled by the external control signals, a variable transformer operated by motor drive.

Four preferred embodiments are shown to illustrate the invention.

I. FIG. 1 shows the first embodiment of the invention. Electric signals equivalent to temperature at the front portion of the nozzle 10, detected by the front temperature sensor 31, are input into the temperature controller 40. Then the detected electric signal is compared to a temperature preset by a temperature setting device 41 included in the temperature controller 40. Next the temperature controller 40 outputs signals to the relay 55 to cancel the difference between detected temperature and preset temperature. Then the temperature controller 40 outputs the signals to the relay 55 so that ON time in the ON-OFF operation of the relay 55 is longer to raise the temperature of the front portion of the nozzle 10.

Both electric signals including those output from the front temperature sensor 31 and the rear temperature sensor 35 are input into the operational amplifier 45. There the difference between the two electric signals is calculated by the subtractor 46. The difference is amplified by the amplifier 47 and the constant adder 48 adds a constant value to the amplified signals. Then the external control signals, with a constant value added, are input into the voltage regulator 50.

The voltage regulator 50 controls the voltage applied to the rear band heaters 25 according to the value of the external control signals. The first embodiment of the invention shows that the front band heater 21 is connected directly to the relay 55 and the rear band heaters 25 are connected through the voltage regulator 50. Therefore, the voltage applied to the rear band heaters 25 is varied by the voltage regulator 50 so as to decrease the temperature of the rear portion. However, though the voltage applied to the front band heater 21 is not changed, the electric power applied thereto is increased by the longer elapsed time of ON in the ON-OFF operation of the relay 55 to raise the temperature of the front portion of the nozzle 10.

Specifically illustrating the first embodiment of the invention: Assuming that the front portion and the rear portion of the nozzle 10 are respectively at 240° C. detected by the front temperature sensor 31 and at 260° C. detected by the rear temperature sensor 35 to a temperature 260° C. preset by a temperature setting device 41. Once a difference of temperature is detected, the temperature controller 40 outputs electric signals to relay 55 so as to cancel the difference of the compared temperatures. The relay 55 commences ON-Off operation in a constant cycle under a closed loop control due to PID control, wherein the elapsed time of ON in the ON-OFF operation of the relay 55 get longer, it is made longer to increase electric power supplied to the front band heater 21.

However it is not preferable that increased electric power is applied to the rear band heaters 25 similarly as to the front band heater 21 because of greater raising of the temperature at the rear portion. Therefore, the first embodiment of the invention prevents more raising of temperature at the rear portion by decreasing the voltage applied to the rear band heaters 25.

A type K thermocouple is preferably used respectively for the front temperature sensor 31 and the rear temperature sensor 35. The thermal electromotive force of the type K thermocouple is 10.56 mV at 260° C. and 9.745 mV at 240° C. respectively. The output signals from the front and rear temperature sensors 31, 35 are input into the operational amplifier 45 and the subtractor 46 subtracts the thermal electromotive forces of those, $$9.745-10.56=+0.815(mV).$$

Assuming that the amplifying magnitude is 1000 times, the amplifier 47 outputs $$-0.815(mV)\times 1000=-0.815(V).$$

As the constant adder 48 adds 5 volts to the amplified value (the 5 volts is a value of a specific embodiment of the invention), the constant adder 48 outputs, to the voltage regulator 50, $$-0.815(V)+5(V)=4.185(V).$$

The adder 48 is capable of correcting any error of the thermal electro motive force in the front and rear temperature sensors 31, 35.

When the external control signal of 4.185(V) is input into the voltage regulator 50, and the power supply voltage is AC 200 volts. The voltage regulator 50 outputs, according to the function thereof, $$\{200(4.185-1)\}/(5-1)=159.25(V).$$

When the temperature at the tip portion of the nozzle 10 drops to less than that at the rear portion thereof, the voltage applied to the rear band heater 35 drops to less than AC 200 volts.

Figure 2:
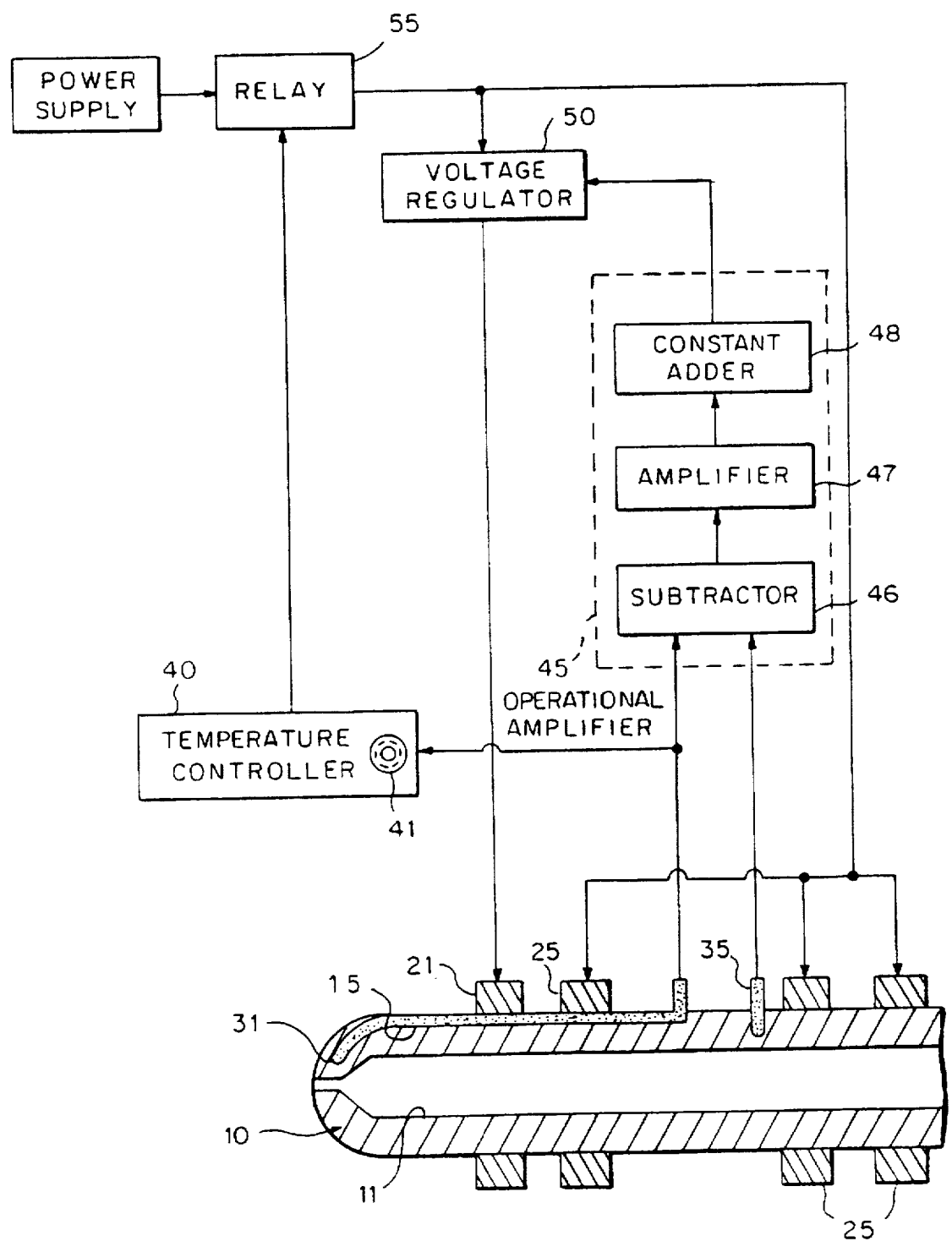
FIG. 2 is a block diagram of a control system for controlling nozzle temperature according to a second embodiment of the invention.

II. FIG. 2 shows the second embodiment of the invention. The signals detected by the front temperature sensor 31 are input into the temperature controller 40, wherein they are compared to the setting temperature signal to output a control signal into the relay 55 by which the electric power to the rear band heaters 25 is controlled. That is, ON time in the ON-OFF operation of the relay 55 is controlled by a setting temperature at the rear portion of the nozzle 10.

The signals detected by the front temperature sensor 31 and the rear temperature sensor 35 are input into the operational amplifier 45 in which the detected signals are subtracted by the subtractor 46, amplified by the amplifier 47, and added to by the constant adder 48. The external control signals are output into the voltage regulator 50.

In the second embodiment, the subtractor 46 is designed to subtract the value detected by the front temperature sensor 31 from the value detected by the rear temperature sensor 35, conversely to the embodiment of the firs embodiment. Accordingly, when the temperature detected by the front temperature sensor 31 is lower than that detected by the rear temperature sensor 35, the voltage applied to the front band heater 21 is increased to raise the temperature of the tip of the nozzle 10. Therefore the voltage applied to the front heater 21 is increased in proportion to the degree of the temperature drop at the tip portion of the nozzle 10.

Figure 3:
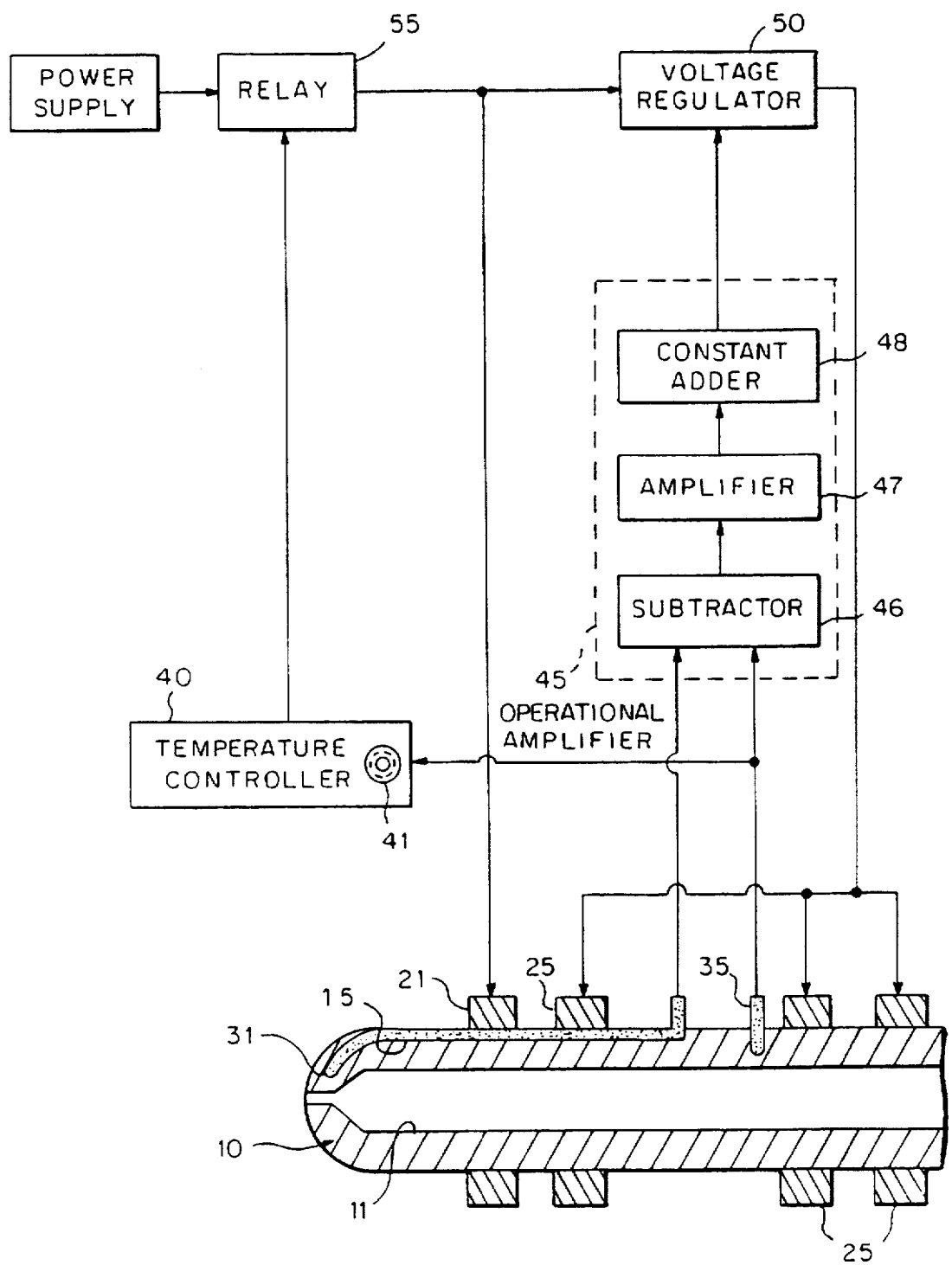
FIG. 3 is a block diagram of a control system for controlling nozzle temperature according to a third embodiment of the invention.

III. FIG. 3 shows the third embodiment of the invention. The signals from the real temperature sensor 35 are input into the temperature controller 40 wherein they are then compared to the signal setting temperature signal to output a control signal into the relay 55, by which the electric power to the front band heater or heaters 21 is controlled. That is, ON time in the ON-OFF operation of the relay 55 depends upon a setting temperature, and in this embodiment it is kept longer to raise the temperature at the front portion of the nozzle 10.

Also, the signals detected by the front temperature sensor 31 and the rear temperature sensor 35 are input into the operational amplifier 45 in which the detected signals are subtracted by the subtractor 46, and amplified by the amplifier 47, and in which the constant is added to them by the constant adder 48.

The external control signals are output into the voltage regulator 50.

In the third embodiment, the subtractor 46 is designed to subtract the value detected by the rear temperature sensor 35 from the value detected by the front temperature sensor 31 just as in the case of the first embodiment. Accordingly, when the temperature detected by the front temperature sensor 31 is lower than that detected by the rear temperature sensor 35, the voltage applied to the rear band heater 25 is decreased to lower the temperature of the tip of the nozzle 10. Therefore the voltage applied to the rear band heater 25 is decreased in proportion to the degree of the temperature drop at the tip portion of the nozzle 10.

Figure 4:
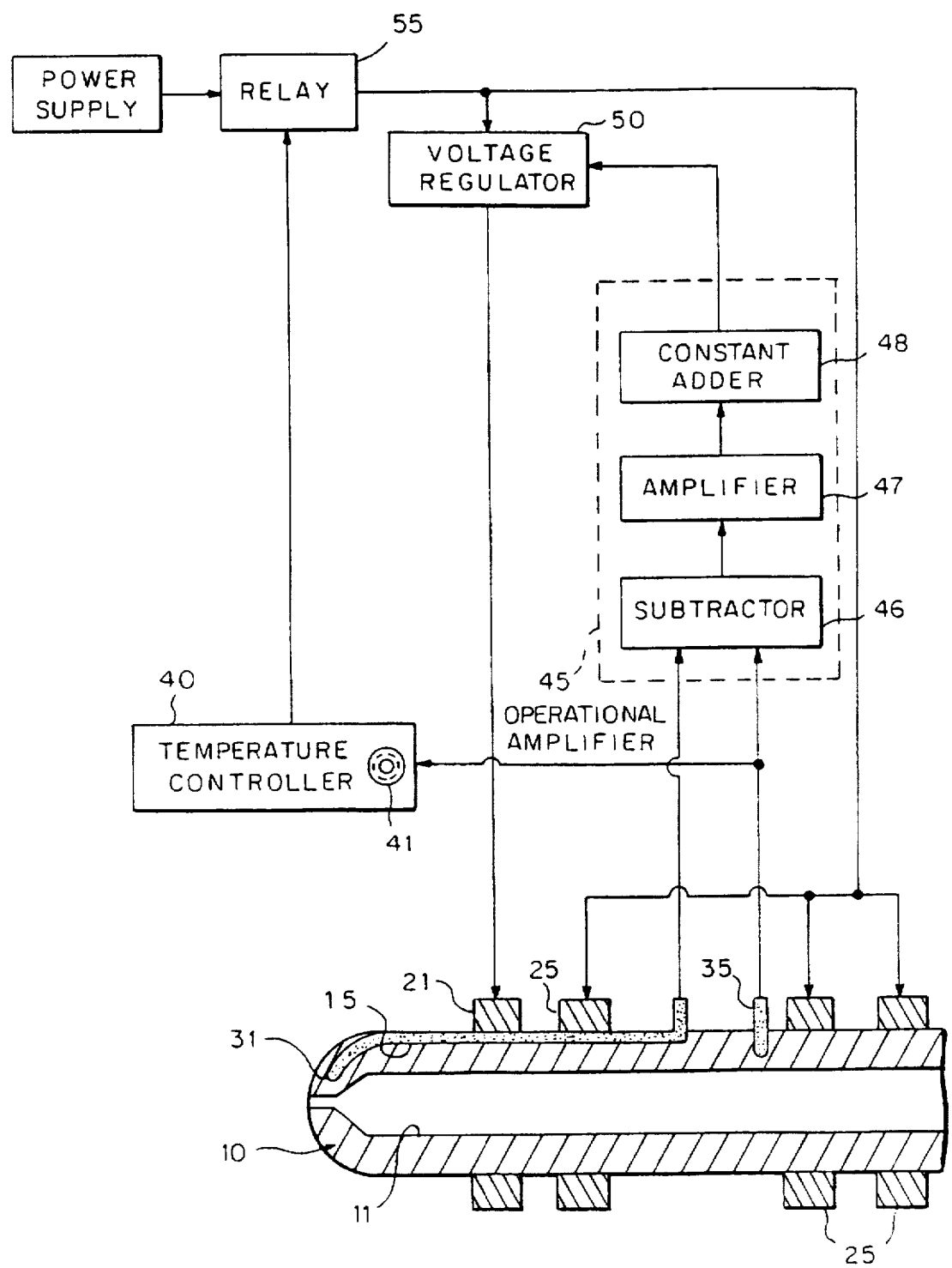
FIG. 4 is a block diagram of a control system for controlling nozzle temperature of a fourth embodiment of the invention.

IV. FIG. 4 shows the fourth embodiment of the invention. The signals detected by the rear temperature sensor 35 are input into the temperature controller 40 and then compared to the setting temperature signal to output a control signal into the relay 55, by which the electric power to the rear band heaters 25 is controlled. That is, ON time in the ON-OFF operation of the relay 55 is controlled by a setting temperature. In this embodiment it is kept shorter to make the temperature at the rear portion of the nozzle 10 lower.

Signals detected by the front temperature sensor 31 and the rear temperature sensor 35 are input into the operational amplifier 45 in which the detected signals are subtracted by the subtractor 46, amplified by the amplifier 47, and added to by the constant adder 48.

The external control signals are output into the voltage regulator 50.

In the fourth embodiment, the subtractor 46 is designed to subtract the value detected by the front temperature sensor 31 from the value detected by the rear temperature sensor 35, similarly to the case of the second embodiment. Accordingly when the temperature detected by the front temperature sensor 31 is lower than that detected by the rear temperature sensor 35, the voltage applied to the front band heater 25 is increased in proportion to the degree of the temperature drop at the tip portion of the nozzle 10.

As described above, the voltage applied to the band heaters used in the invention varies from 0 volts to 200 volts (power supply voltage). Accordingly it is required that the band heaters have sufficient thermal capacity (heating ability) at 80% of AC 200 volts and can maintain a useful band heater lifetime at 100% of AC 200 volts.

Thus, it can be seen that the invention provides a novel system which: is capable of controlling temperature at the rear and front portions of the nozzle of an injection machine in spite of the problem that temperature at the front portion of the nozzle drops due to mold touching; is capable of maintaining uniform temperature at the front portion and the rear portion of the nozzle with the minimum necessary devices due to a combination of electric power control and voltage regulation to the front band heater and the rear band heater; and is capable of preventing stringiness, clogging, burning, and drooling of melted resin to maintain quality of molded articles.

The foregoing description of the specific embodiments will so fully reveal the general nature of the invention that other can, by applying current knowledge, readily modified and/or adapt for various applications such specific embodiments without undue experimentation and without departing from the generic concept, and, therefore, such adaptation and modifications are intended to be comprehended within the meaning and range of equivalents of the disclosed embodiments. The means and material for carrying out various sclosed functions may take a variety of alternative forms without departing from the invention. It is to be understood that the phraseology or terminology employed herein is for the purpose of description and not limitation.

What is claimed is:

1. A device for controlling a temperature of an injection molding machine nozzle comprising:

at least one front heater for heating a front portion of the nozzle;

a front temperature sensor for detecting temperature at the front portion of the nozzle;

at least one rear heater for heating a rear portion of the nozzle;

a rear temperature sensor for detecting temperature at the rear portion of the nozzle;

a relay for conducting and shutting off current to the front and rear heaters with an ON-OFF operation;

a temperature controller including means to compare a predetermined temperature signal to an input temperature signal from one of the front temperature sensor and the rear temperature sensor and then to output to the relay an output signal for controlling electric power supplied to one of the front heater and the rear heater;

a voltage regulator for regulating voltage applied to one of the front heater and the rear heater; and an operational amplifier including means for outputting a control signal to the voltage regulator to increase or decrease the voltage due to a difference between temperatures detected by the front temperature sensor and the rear temperature sensor.

2. The device according to claim 1, wherein the temperature controller includes means for changing elapsed time of ON in the ON-OFF operation of the relay.

3. The device according to claim 1, wherein the operational amplifier includes subtractor, an amplifier, and a constant adder.

4. The device according to claim 3, wherein the subtractor includes means to subtract a rear signal detected by the rear temperature sensor from a front signal detected by the front temperature sensor and the device includes means to decrease the voltage of the rear heater in case the front heater heats the nozzle only with electric power control of a relay.

5. The device according to claim 3, wherein the subtractor includes means to subtract a front signal detected by the front temperature sensor from a rear signal detected by the rear temperature sensor and the device includes means to increase the voltage of the front band heater in case the rear band heater heats the nozzle only with electric power control of a relay.

6. The device according to claim 3, wherein the constant adder includes means to add a constant to signals amplified by an amplifier to input signals adapted for the voltage regulator.

* * * * *